United States Patent [19]

Necsoiu et al.

[11] 4,362,066

[45] Dec. 7, 1982

[54] STEP ADJUSTABLE MONOAXIAL VIBRATOR

[75] Inventors: Ion-Jan Necsoiu; Polidor P. Bratu; Aurelian Ghinea, all of Bucharest; Gavril Axinte, Braila, all of Romania

[73] Assignee: Institutul de Cercetari in Constructii si Economia Constructiilor, Bucharest, Romania

[21] Appl. No.: 188,733

[22] Filed: Sep. 19, 1980

[51] Int. Cl.³ .......................... B06B 1/16; B65G 27/20

[52] U.S. Cl. ............................................ 74/87; 74/61

[58] Field of Search .................. 74/61, 87; 128/34-37; 173/49; 198/770; 209/366.5, 367; 310/81; 366/123, 128; 404/117

[56] References Cited

U.S. PATENT DOCUMENTS

| | | | |
|---|---|---|---|
| 1,719,123 | 7/1929 | Mitchell | 74/87 |
| 2,945,970 | 7/1960 | Nordegren | 366/123 |
| 2,953,282 | 9/1960 | Peterson | 74/61 |
| 2,970,487 | 2/1961 | Ongaro | 74/61 |

FOREIGN PATENT DOCUMENTS

| | | | |
|---|---|---|---|
| 1063465 | 5/1954 | France | 74/87 |
| 1094450 | 5/1955 | France | 74/87 |
| 367652 | 4/1963 | Switzerland | 74/87 |

*Primary Examiner*—Lawrence J. Staab
*Attorney, Agent, or Firm*—Karl F. Ross

[57] ABSTRACT

The invention refers to a step adjustable monoaxial vibrator intended to be used on the vibrating rollers or similar machines.

In order to adjust the peak value of the excitation at various levels, it has three rotary balls (rollers) rolling along the pendular frame rolling path while being driven by a dynamic balanced fork as a rotor.

Across the rotor axle there is an obturating rod in order to locate the central ball either in the same compartment or in the opposite one versus the remaining two balls.

This allows the steady frequency excitation to be set up either at the maximum peak value or at a value three times lower. By removing the central ball, a medium size excitation is obtained.

1 Claim, 1 Drawing Figure

STEP ADJUSTABLE MONOAXIAL VIBRATOR

FIELD OF THE INVENTION

The invention relates to a step adjustable monoaxial vibrator intended to be used with vibrating rollers or similar machines.

BACKGROUND OF THE INVENTION

There are already known ball type vibrators using a hydrostatic engine in order to drive a fork that carries the rotary ball. However, the peak value of the excitation cannot be adjusted while maintaining the vibration frequency which is to be avoided by the engine simultaneously steady. In addition, there are circular vibration generators, loading the ball bearings at full load induced by the excitation.

OBJECT OF THE INVENTION

The object of the invention is to provide a step adjustable monoaxial vibrator which obviates all the disadvantages mentioned above.

SUMMARY OF THE INVENTION

In order to adjust the peak value of the excitation at various levels, the vibrator of the invention has three rotary balls (rollers) rolling along a pendular frame rolling path while being driven by a dynamic balanced fork as a rotor. Along the rotor axle there is provided an obturating rod which locates the central ball either in the same compartment or in the opposite one versus the remaining two balls. This allows the steady frequency excitation to be set up either at the maximum peak value or at a value three times lower.

BRIEF DESCRIPTION OF THE DRAWING

The sole FIGURE of the drawing is a longitudinal section in perspective view.

SPECIFIC DESCRIPTION

Figure 1:
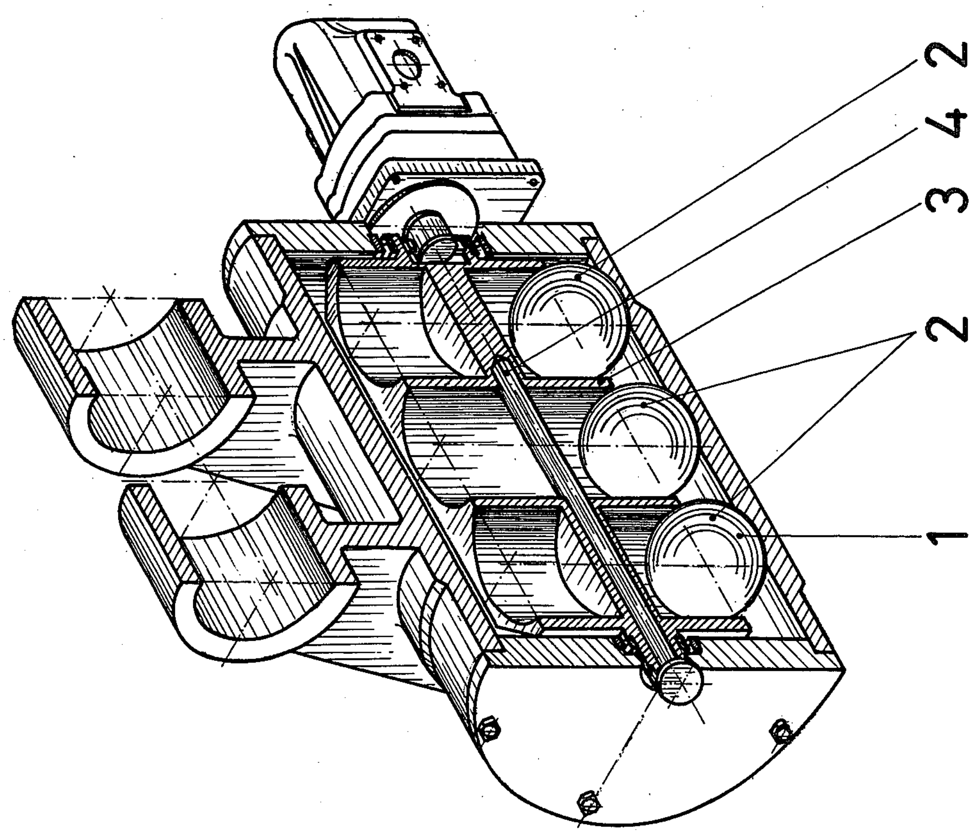

The vibrator according to the invention consists of a pendular frame 1, three similar rotary balls (rollers) 2 rolling along the rolling path of the frame while driven by a dynamic balanced rotor 3.

The rotor is provided with a throughgoing central hole permitting the ball 2 to be located either on one side or on the other of the rotor axis.

The central ball can be located in one of the side compartment of the central hole of the rotor by means of an obturating rod 4 fitted axially in the rotor.

The peak value of the excitation can be adjusted at three different levels (three steps) as follows:

1st step: two balls on one side and the third (the central ball) on the opposite side of the rotor axis;

2nd step: only two balls (the extreme ones) on one side of the rotor axis;

3rd step: all the three balls on the same side of the rotor axis.

Assuming that the vibrator is adjusted to work in the 3rd step the adjustment of the excitation from the third to the first level can be performed as follows:

the obturating rod 4 is first unlocked and removed and then the rotor 3 is turned through 180° enabling the central ball to fall into the opposite compartment;

the ball is prevented to return in the previous compartment by replacement and locking of the obturating rod 4.

to return the vibrator from the 1st to the 3rd working step, one can proceed in a similar manner.

The adjustment of the vibrator into the 2nd working step can be performed by dismounting the vibrator and removing the central ball 2.

The maximum peak value of the excitation is obtained in the 3rd working step.

The peak value of the excitation in the working step is $\frac{1}{3}$ its maximum peak value.

The peak value of the excitation in the 2nd working step is $\frac{2}{3}$ its maximum peak value.

The vibrator according to the invention, has the following advantages;

it generates only monoaxial vibrations:

unloads the ball bearings of the additional load due to an excentrical rotor by using a dynamic balanced rotor to drive the rolling units;

long life under service;

provides a compact vibrator assembly; and enables quick working step selection between the 1st and the third step either from the first working step to the third one or conversely.

We claim:

1. A step adjustable vibrator comprising:

a hollow housing defining a roller track surface on its interior;

a balanced rotor mounted in said housing to rotate about an axis of rotation surrounded by said roller track surface, said rotor having a plurality of axially spaced roller receiving compartments extending transversely of said axis of rotation;

a plurality of rollers carried by said rotor such that they roll along said roller track surface as said rotor turns, one roller being received in each of said compartments, at least a pair of first rollers being situated on one side of said axis of rotation, a second roller being carried by said rotor in a respective compartment extending to opposite sides of said axis of rotation whereby said second roller can be selectively situated on either side of said axis of rotation depending upon the selected step in adjustment of the mode of operation of the vibrator; and a movable blocking rod positioned along said axis of rotation and blocking moving of said second roller from one side of said axis of rotation to the other, said blocking rod being movable to unblock movement of said second roller and allows said second roller to move from one side of said axis to the other, whereby when said second roller is situated on the same side of said axis as said first roller, the vibrator generates vibration at a first level and when said second roller is situated on the opposite side of said axis from said first rollers, the vibrator generates vibrations at a second relatively lower level.

* * * * *